Sept. 22, 1936.   H. T. WOOLSON   2,055,325
POWER TRANSMISSION
Filed Jan. 31, 1934   2 Sheets-Sheet 2
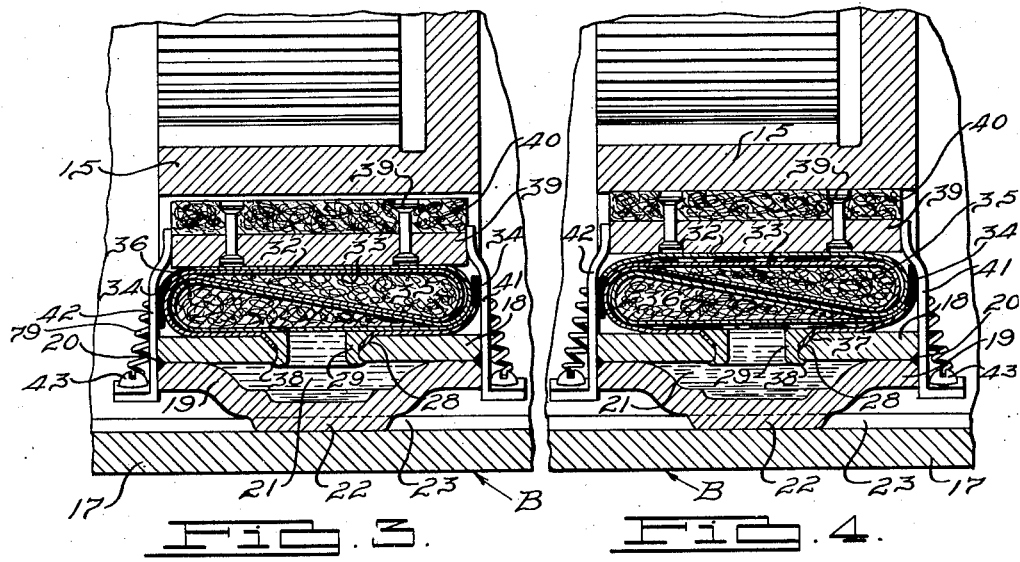
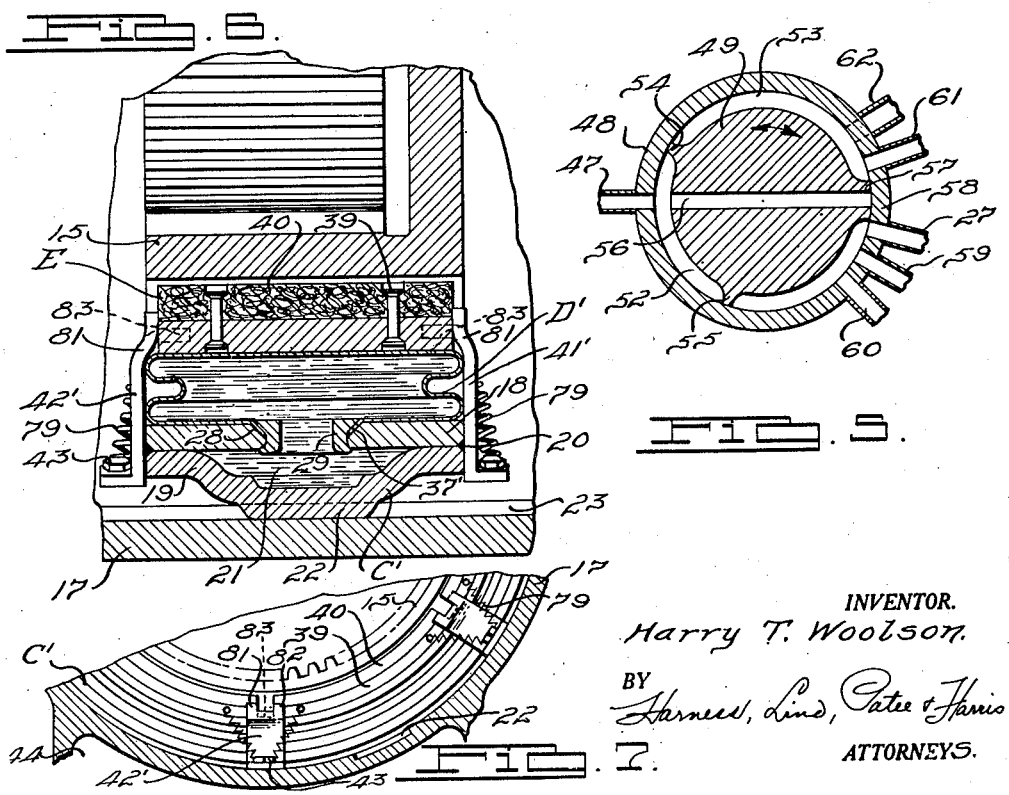
INVENTOR.
Harry T. Woolson.
BY
ATTORNEYS.

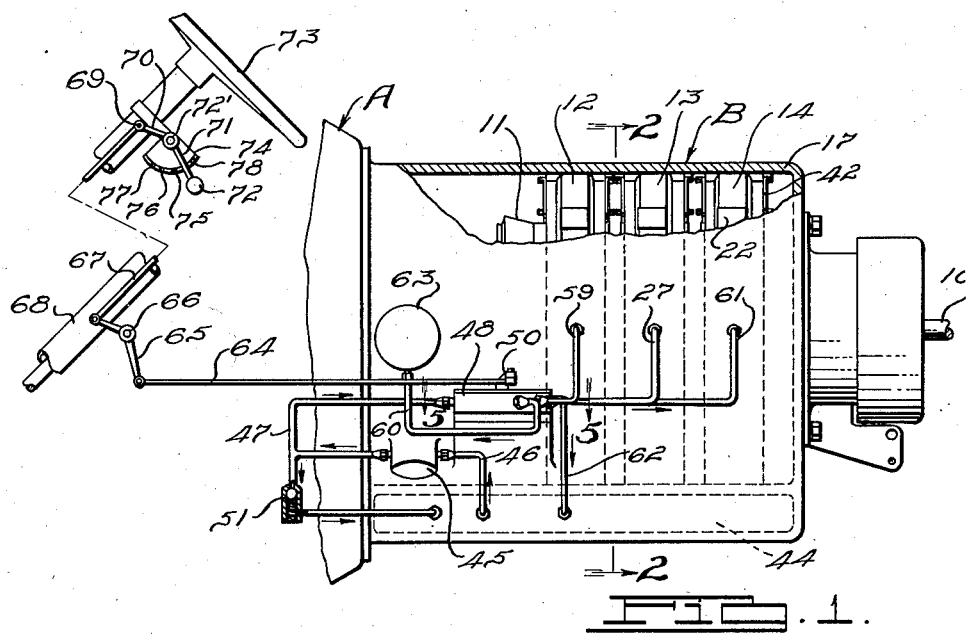

Patented Sept. 22, 1936

2,055,325

UNITED STATES PATENT OFFICE 2,055,325

POWER TRANSMISSION

Harry T. Woolson, Detroit, Mich., assignor to Chrysler Corporation, Detroit, Mich., a corporation of Delaware Application January 31, 1934, Serial No. 709,151

3 Claims. (Cl. 188—152)

This invention relates to power transmissions and refers more particularly to improvements in transmissions and controls for varying the driving speed ratio of motor cars or vehicles.

My invention is especially adapted for use with motor vehicles having epicyclic or planetary transmissions or other transmissions or similar speed ratio changing devices. Thus, for example, in a planetary transmission having the usual speed ratio controlling clutches or brakes for the various drums or rotary elements of the gear trains, it is often preferred to actuate these transmission controlling clutches by fluid pressure.

One object of my invention resides in the provision of improved means for controlling and actuating the various speed ratio controlling clutches of a power transmission of the planetary or similar type.

A further object of my invention resides in the provision of fluid pressure operated transmission controlling means capable of manufacture and assembly at a relatively small cost and having improved efficiency in operation.

In carrying out the objects of my invention I have provided a plurality of controlling devices respectively associated with the aforesaid rotary drums or elements of the planetary gear trains, each of these controlling devices consisting of one or more fluid pressure operated bellows or diaphragms adapted to actuate suitable brake shoe means into braking or clutching engagement with the rotary elements of the aforesaid gear trains. I have further provided means for selectively distributing the fluid pressure to the various diaphragms whereby the transmission controlling clutches may be selectively operated to vary the driving speed ratio of the transmission.

In one illustrated embodiment of my invention I have provided a fluid pressure operated controlling device for each of the rotary drums of a transmission gear train of the planetary gear type, this controlling device comprising a plurality of bellows or diaphragm units, each of the bellows units having a brake shoe associated therewith and each being simultaneously actuated by fluid pressure so that, among other advantages, the braking effort applied to the drum is substantially equalized around the circumference thereof so as to prevent a tendency toward displacement of the axis of the drum.

A further feature of my invention resides in the manner of assembling the aforesaid brake shoes and bellows units so that they may be readily removed from the assembly for purposes of inspection or repair.

In another embodiment of my invention I have illustrated the manner in which the bellows or diaphragms for controlling the various planetary gear trains may each extend as a unit around the associated drums, each diaphragm having a fluid pressure supply.

In both embodiments of my invention as illustrated, I have provided manually controlled means for selectively distributing the fluid under pressure to the diaphragm means and braking means associated with each of the gear speed ratio controlling clutches.

Further objects and advantages of my invention will be apparent from the following detailed description of several illustrative embodiments thereof, reference being had to the accompanying drawings in which:

Fig. 1 is an elevational view of a planetary gear transmission embodying my invention, parts of the transmission casing being broken away to illustrate the gear speed ratio controlling clutches.

Fig. 2 is a sectional elevational view of one of the transmission controlling clutches embodying my invention, the section being taken along the line 2—2 of Fig. 1.

Fig. 3 is an enlarged sectional detailed view along the line 3—3 of Fig. 2, the clutching or braking means being shown in the disengaged position.

Fig. 4 is a sectional view corresponding to Fig. 3 but illustrating the parts in their operative position.

Fig. 5 is a sectional plan view through the distributing valve means for the fluid pressure, the section being taken along the line 5—5 of Fig. 1.

Fig. 6 is a view generally corresponding to Fig. 3 but illustrating a modified form of my invention in which the diaphragm means extends as a unit around the associated drum.

Fig. 7 is a side elevational view of a portion of the drum and braking means shown in Fig. 7.

Referring to the drawings, it will be noted that I have elected to illustrate my invention as a part of the driving mechanism of a motor vehicle in which A represents a portion of the clutch adapted to be driven by the usual engine (not shown), this clutch preferably being of the fluid coupling type where the transmission is a planetary gear type although any suitable type of clutch may be employed to provide a releasable driving connection between the engine and the vehicle driving parts operated therefrom.

The clutch A is adapted to drive a speed ratio changing transmission B, the drive being taken therefrom by a shaft 10 which may drivingly connect the rear wheels (not shown) of the motor vehicle in any suitable well-known manner. The transmission B is preferably a planetary type having a plurality of speed ratio controlling clutches or brakes for the rotary drums or elements associated with the various planetary gear trains, these controlling clutches being generally indicated in Fig. 1 at 11, 12, 13 and 14. Thus, when the controlling clutch or brake 13 is actuated in a manner hereinafter more apparent, transmission B is actuated in its first speed ratio, and likewise the clutches or brakes 11, 12 and 14 are respectively adapted to control the transmission for the direct speed or high gear ratio, the second speed ratio, and for reverse.

Referring to Fig. 2, I have illustrated in cross section and in somewhat diagrammatic form the customary arrangement of the planetary gear train for one of the controlling clutches such as the clutch 13 for controlling the first speed gear ratio. Thus, 15 represents the drum of the first speed planetary gear set 16, it being understood that when drum 15 is held against rotation, the planetary gearing 16 will effect a low speed gear ratio drive through the transmission in a well-known manner. I will now describe my braking means illustrated in Fig. 2 in association with the drum 15, it being understood that the braking means associated with the controlling clutches 12 and 14 are similarly constructed.

The casing 17 of transmission B extends around drum 15 and is spaced therefrom to receive the fluid conducting conduit C, the diaphragm or bellows means D, and the braking means E engageable with drum 15 to arrest rotation thereof.

The conduit C is formed of a pair of annular members 18 and 19 welded at 20 around each side of the conduit to prevent escape of the fluid. The members 18 and 19 are formed to provide an annular fluid conducting passage 21, and in order to hold the conduit against rotational displacement, the member 19 has a series of circumferentially spaced outwardly extending lugs 22 engageable in corresponding recesses 23 formed in the transmission casing 17. The member 19 has a suitable fluid conducting opening 24 registering with an opening 25 in casing 17, the opening 25 receiving the fitting 26 of the fluid pressure conducting pipe or conduit 27 which will be referred to more in detail hereinafter. The inner member 18 of the conduit C has a plurality of radially inwardly extending openings 28 each being adapted to receive a clamping member or nipple 29.

In the form of my invention illustrated in Figs. 2, 3 and 4, the diaphragm means D is illustrated as comprising a plurality of annular diaphragm segments 30, spaced circumferentially from each other and held against rotational displacement by reason of the radially extending projections 31 carried by the member 18, these projections 31 extending inwardly from member 18 and beyond the diaphragm units 30 so as to prevent rotational displacement of the brake shoe members or units referred to hereinafter. The diaphragm units 30 may comprise a pair of relatively thin metallic plates 32, 33 closed around the marginal edges by welding or brazing as indicated at 34, these plates being fashioned with a double return bend as generally indicated in Figs. 3 and 4 to receive the filler members 35 and 36. These filler members may be formed by filling the spaces which they occupy with plastic wood or other suitable material which may be molded in place and which will harden to the desired shape when the material is set. The outer plate 32 of each of the diaphragm units 30 has an opening 37 adapted to be clamped to the opening 27 of member 18 by reason of the nipple 29, the latter being spun over at 38 to secure the diaphragm unit to the member 18 and to provide a fluid tight joint, the nipple 29 placing the fluid conduit 21 in communication with the space between the diaphragm plates 32 and 33. By employing the filler members 35 and 36, the capacity of the diaphragm is maintained relatively low so that very little fluid need be introduced between the diaphragm plates in order to effect the desired operation of the diaphragm.

In Fig. 3 one of the diaphragm units is illustrated in the inoperative position and in Fig. 4 the same diaphragm is illustrated in the operative or expanded position, it being understood that fluid pressure has been introduced through conduit 21 so as to cause radial separation between the diaphragm plates 32 and 33 as indicated in Fig. 4 by the spaces between these plates.

Associated with each of the diaphragm units 30 is a braking means generally designated at E, this braking means comprising an arcuate segmental shoe 39 preferably freely resting on the plate 32 of the diaphragm unit associated therewith.

This shoe 39 carries an arcuate segmental band of friction material 40 adapted to engage the drum 15, the aforesaid projections 31 carried by the members 18 extending between adjacent shoes 39 so as to prevent rotational displacement of the shoes.

Secured to the transmission casing 17 at points spaced around the casing, I have provided a plurality of brackets 41 and 42 respectively associated at the opposite sides of conduit C, these brackets extending radially inwardly to prevent axial displacement of the diaphragm units 30 as well as similar displacement of the braking means or units E. The brackets are readily removable from casing 17 by suitable fasteners 43 so that on removal of the brackets the shoes 39 and friction material 40 carried thereby may be readily removed for inspection or replacement. In similar manner the conduit C and diaphragm units 30 may also be readily removed.

In order to selectively control the supply of fluid under pressure to the actuating mechanism for the various speed ratio controlling clutches, I have provided a fluid pressure control system illustrated in somewhat diagrammatic form in Fig. 1. The transmission reservoir 44 contains a quantity of fluid such as oil, a pump indicated at 45 being suitably driven so as to draw the oil from the reservoir 44 by reason of a pipe or conduit 46, the oil under pressure being discharged from the pump through a conduit 47 leading to a valve casing 48 rotatably housing a distributing valve 49, this valve being adapted for rotary manual control by the lever 50. A relief valve 51 may be interposed between reservoir 44 and conduit 47 so as to by-pass any excess delivery of pump 45 back to the reservoir.

The valve 49 cooperates with casing 48 to provide a fluid pressure supply space or chamber 52 and a low pressure space or chamber 53, these chambers being separated from each other by the radially extending valve portions 54 and 55 engaging casing 48. The supply chamber 52 delivers oil under pressure from supply conduit 47 through a passage 56 extending through the valve to an outlet 57 illustrated in Fig. 5 as registering with a portion of the casing 48 so as to close off the outlet 57. The part of the casing which registers with outlet 57 in the position of the valve 49 as shown in Fig. 5 is indicated at 58 and corresponds to the neutral positioning of valve 49. In this position none of the transmission controlling clutches are actuated and power is not being delivered to the output shaft 10 of the transmission. The casing 48 has a series of conduits adapted to be selectively registered with outlet 57 when valve 49 is rotated by lever 50 to selectively cause actuation of the various speed ratio controlling clutches of the transmission B.

Thus, the conduit 27 previously referred to is adapted to supply fluid under pressure to the diaphragm means D associated with the first speed controlling clutch 13 when outlet 57 is registered with the conduit 27. In similar manner conduit 59 is adapted to supply fluid to actuate the diaphragm means and brake means associated with the second speed controlling clutch 12, conduit 60 being adapted to supply fluid pressure to actuate the third or direct speed controlling clutch 11. Conduit 61 is adapted to supply fluid under pressure to actuate the reverse controlling clutch 14.

Valve casing 48 also has a further conduit 62 which communicates at all times with the chamber 53 at such a point that the outlet 57 does not register with the conduit in any of the positions of movement of the valve 49. Thus, in Fig. 5 I have illustrated the conduit 62 as communicating with the chamber 53 at a point below the plane of movement of the outlet 57 as the valve 49 is oscillated selectively between the ordinary limits of its travel defined by the end conduits 60 and 61. The conduit 62 is the fluid return line and as shown in Fig. 1 this conduit leads back to the oil reservoir 44 so as to return fluid from any of the supply lines or conduits which are not being supplied with fluid from the outlet 57.

It is generally customary in planetary transmissions to provide the direct speed controlling clutch 11 in the form of a cone type of clutch and this is the general form that I have illustrated in Fig. 1. Thus, if desired, this direct speed clutch may be actuated by a suitable pressure cylinder and associated piston generally designated at 63 in Fig. 1 or, if desired, this direct speed controlling clutch may have my diaphragm means associated therewith and suitably arranged.

Pivotally connected to the lever 50 is a link 64 actuated by one arm of a bell crank lever 65 pivotally supported at 66, the other arm of the bell crank lever being pivotally connected to a link 67 extending along the vehicle steering post 68 for pivotal connection at 69 to an arm 70 of a selector lever 71 pivotally mounted at a suitable point 72' for convenient operation. The selector lever 71 has a handle 72 adapted to be actuated by the vehicle operator. The selector lever 71 is shown mounted below the usual vehicle steering wheel 73 and associated with the selector lever is a selector segment 74 having a series of grooves or notches adapted to be selectively registered with the lever 71 when this lever is actuated on its pivot 72' to operate the valve 47 in registering the outlet 57 with the various conduits aforesaid. Thus, the segment 74 has a series of grooves 75, 76, 77 and 78, these grooves being respectively adapted to position valve 49 to cause the transmission B to operate in the first gear ratio, the second gear ratio, the direct speed ratio, or the reverse drive. In Fig. 1 the selector lever 71 is illustrated in the neutral position intermediate the grooves 75 and 76, this position of the lever corresponding to the position of valve 49 as illustrated in Fig. 5.

It will be apparent that the vehicle operator may adjust the selector lever 71 so as to engage any of the notches in the selector segment 74 whereby to cause the valve 49 to be adjusted to deliver fluid under pressure to the corresponding transmission controlling clutch. The various diaphragm means associated with each of the transmission controlling clutches is thus under selective control on the part of the operator. After one of the diaphragm means associated with a transmission controlling clutch has been actuated to expand the diaphragm plates 32 and 33 as illustrated in Fig. 4 it will be understood that when valve 49 is again manipulated to relieve the diaphragm means previously established, the diaphragm plates will be restored to their normal positions illustrated in Fig. 3, the fluid displaced by this return movement being returned to the oil reservoir 44 by reason of the return conduit 62.

In order to relieve the drag of the friction band segments 40 and space the bands from the associated drums when the diaphragm means of any of the controlling clutches is not in operation, I have provided a series of springs 79 conveniently extending between the fasteners 43 and pins 80 projecting laterally from the shoes 39. These springs also serve to assist in restoring the diaphragm plates 32 and 33 to the positions shown in Fig. 3 when the fluid pressure is released from these diaphragm plates. The diaphragm plates preferably tend to spring back to the Fig. 3 position under their inherent resilience.

Referring now to Figs. 6 and 7, I have illustrated a slightly modified embodiment of my invention in which the diaphragm means is formed as a continuous annular diaphragm chamber instead of being formed as a plurality of circumferentially spaced diaphragm units as illustrated in the Fig. 2 embodiment. In Figs. 6 and 7, many of the parts are the same as previously described as will be noted by the similarity of the reference characters. The conduit means C' is identical with the conduit means C of Fig. 2 except that in Fig. 6 it is only necessary to have a single outlet for the fluid pressure intermediate the annular conduit 21 and the annular diaphragm means D'. I preferably embody the aforesaid braking means E in the form of a plurality of circumferentially spaced braking units so as to readily adapt the device to radial movement of these braking units and also to efficiently apply and distribute the braking effort circumferentially around the drum associated therewith.

In Figs. 6 and 7 the annular diaphragm or bellows D' may be formed of a single metallic plate secured at its fluid inlet 37' to the member 18 by reason of the same nipple 29 aforesaid. The brackets 41' and 42' are somewhat heavier than the aforesaid corresponding brackets 41 and 42 of Fig. 2 since, in Figs. 6 and 7, these brackets 41' and 42' are adapted to take the place of the projections 31 of Fig. 2 and thereby anchor the brake shoes 39 against rotational displacement. Thus, these brackets have terminal fingers 81 and 82 adapted to prevent axial displacement of the shoes 39, and intermediate these fingers the brackets have an inwardly extending lug or projection 83 adapted to substantially fill the space circumferentially between adjacent shoes 39. The brackets 41' and 42' are also adapted to function in a manner similar to that described in connection with the aforesaid brackets 41 and 42 in order to prevent axial shifting of the conduit C', diaphragm D', and braking means E.

In operation of the means for controlling the transmission speed ratio controlling clutches as illustrated in Figs. 6 and 7, it should be understood that this modified form of actuating means may be substituted for the corresponding actuating means as illustrated and described in the other views of my drawings referred to previously. When the fluid pressure is introduced to the conduit C' this fluid pressure acts on diaphragm D' so as to radially expand this diaphragm or bellows and thereby move the brake band 40 into braking engagement with the associated drums 15 to stop the rotation of this drum. The parts are restored to the position illustrated in Fig. 6 in a manner similar to that previously described in connection with Figs. 3 and 4.

Various modifications and changes will be readily apparent from the teachings of my invention as set forth in the appended claims, and it is not my intention to limit my invention to the particular details shown and described for illustrative purposes.

What I claim is:

1. In a planetary transmission having a rotatable speed ratio controlling drum, a stationary casing structure surrounding said drum and spaced outwardly therefrom, an annular fluid conducting conduit in said space, means for anchoring said conduit to said casing, a radially expansible diaphragm within said conduit, said conduit and said diaphragm having communicating fluid conducting passages, an arcuate brake shoe within said diaphragm and adapted for movement thereby to brake said drum, and means for anchoring said brake shoe, said conduit and brake shoe anchoring means being positioned entirely outwardly from said drum whereby the spaces inwardly and laterally of said drum are free for accommodating other parts of said transmission.

2. In a planetary transmission having a rotatable speed ratio controlling drum, a stationary casing structure surrounding said drum and spaced outwardly therefrom, an annular fluid conducting conduit in said space, means for anchoring said conduit to said casing, a radially expansible diaphragm within said conduit, said conduit and diaphragm having communicating fluid conducting passages, an arcuate brake shoe within said diaphragm and adapted for movement thereby to brake said drum, means projecting inwardly from said conduit into engagement with an end of said shoe to limit rotational displacement of said shoe, said conduit and brake shoe anchoring means being positioned entirely outwardly from said drum.

3. In a planetary transmission having a rotatable speed ratio controlling drum, a stationary casing structure surrounding said drum and spaced outwardly therefrom, an annular fluid conducting conduit in said space, means for anchoring said conduit to said casing, a radially expansible diaphragm within said conduit, said conduit and diaphragm having communicating fluid conducting passages, an arcuate brake shoe within said diaphragm and adapted for movement thereby to brake said drum, and a bracket secured to said casing and projecting inwardly therefrom in contact with a side of said conduit and brake shoe to limit axial displacement thereof, said bracket having its inner end spaced outwardly from said drum and being bent to provide an anchor for an end of said brake shoe.

HARRY T. WOOLSON.